(12) United States Patent
Chen

(10) Patent No.: US 11,007,541 B2
(45) Date of Patent: May 18, 2021

(54) DUST COLLECTING DEVICE USING MULTI-CYCLONE DUST FILTRATION

(71) Applicant: X'POLE PRECISION TOOLS INC., Taoyuan (TW)

(72) Inventor: Bach Pangho Chen, Claremont, CA (US)

(73) Assignee: X'Pole Precision Tools Inc., Taoyuan (TW)

( * ) Notice: Subject to any disclaimer, the term of this patent is extended or adjusted under 35 U.S.C. 154(b) by 216 days.

(21) Appl. No.: 15/960,121

(22) Filed: Apr. 23, 2018

(65) Prior Publication Data

US 2019/0321834 A1 Oct. 24, 2019

(51) Int. Cl.
*B01D 45/00* (2006.01)
*B04C 5/103* (2006.01)
(Continued)

(52) U.S. Cl.
CPC .............. *B04C 5/103* (2013.01); *B01D 45/12* (2013.01); *B04C 5/04* (2013.01); *B04C 9/00* (2013.01);
(Continued)

(58) Field of Classification Search
CPC .. B04C 5/103; B04C 9/00; B04C 5/04; B04C 2009/005; B04C 5/181; A47L 9/1683; A47L 9/1608; A47L 9/165; B01D 45/12
See application file for complete search history.

(56) References Cited

U.S. PATENT DOCUMENTS 2,252,581 A * 8/1941 Saint-Jacques ......... B04C 5/103
209/716
3,885,933 A * 5/1975 Putney ................... B01D 45/12
55/397
(Continued)

FOREIGN PATENT DOCUMENTS

CN          1572220 A    2/2005
CN        103181741 A    7/2013
(Continued)

OTHER PUBLICATIONS

U.S. Appl. No. 16/575,995, filed Sep. 19, 2019.
U.S. Appl. No. 16/576,152, filed Sep. 19, 2019.

*Primary Examiner* — Dung H Bui
(74) *Attorney, Agent, or Firm* — Muncy, Geissler, Olds & Lowe, P.C.

(57) ABSTRACT

A dust collecting device using multi-cyclone dust filtration includes a dust collecting chamber, cyclone chamber and airflow guiding component. The dust collecting chamber communicates with the cyclone chamber having an intake port for a gas to be filtered, an annular side wall connected to intake port and guiding gas to be filtered to form a first cyclone, an engaging port communicated with dust collecting chamber and allowing first cyclone to enter dust collecting chamber, and an exhaust port. The airflow guiding component within cyclone chamber is provided with a return flow tube receiving the returned gas to be filtered and forming a second cyclone, an airflow guiding bonnet separated from return flow tube, and a dust filtration channel between airflow guiding bonnet and return flow tube. The second cyclone flows toward the exhaust port, and enables dust therein to enter cyclone chamber again, as passing by dust filtration channel.

13 Claims, 13 Drawing Sheets

(51) Int. Cl.
  *B04C 9/00* (2006.01)
  *B04C 5/04* (2006.01)
  *B01D 45/12* (2006.01)
  *B04C 5/181* (2006.01)
  *A47L 9/16* (2006.01)

(52) U.S. Cl.
  CPC ............ *A47L 9/165* (2013.01); *A47L 9/1608* (2013.01); *A47L 9/1683* (2013.01); *B04C 5/181* (2013.01); *B04C 2009/005* (2013.01)

(56) References Cited

U.S. PATENT DOCUMENTS

| | | | | |
|---|---|---|---|---|
| 3,960,734 | A * | 6/1976 | Zagorski | B04C 5/103 210/512.2 |
| 6,440,197 | B1 * | 8/2002 | Conrad | A47L 9/1608 55/418 |
| 7,247,180 | B1 * | 7/2007 | Hill | A47L 9/0081 55/315 |
| 9,211,547 | B2 * | 12/2015 | Latta | B07B 7/02 |
| 10,406,535 | B2 * | 9/2019 | Ni | B04C 5/26 |
| 2001/0042283 | A1 * | 11/2001 | Oh | A47L 5/28 15/353 |
| 2005/0138763 | A1 * | 6/2005 | Tanner | A47L 9/165 15/353 |
| 2008/0047091 | A1 * | 2/2008 | Nguyen | A47L 9/1625 15/300.1 |
| 2015/0265112 | A1 * | 9/2015 | Chen | A47L 9/1691 15/347 |
| 2017/0202418 | A1 | 7/2017 | Cheo | |
| 2018/0036746 | A1 | 2/2018 | Antomon | |

FOREIGN PATENT DOCUMENTS

| | | |
|---|---|---|
| EP | 2923625 B1 | 6/2016 |
| JP | 2000254551 A | 9/2000 |
| JP | 2005103251 A | 4/2005 |
| JP | 2005224602 A | 8/2005 |
| JP | 2006205162 A | 8/2006 |
| JP | 2006272322 A | 10/2006 |
| JP | 2006297057 A | 11/2006 |
| JP | 2006346669 A | 12/2006 |
| JP | 2014083478 A | 5/2014 |
| JP | 2015131264 A | 7/2015 |
| TW | 201340929 A | 10/2013 |
| TW | I411422 B | 10/2013 |
| TW | I558462 B | 11/2016 |

* cited by examiner

DUST COLLECTING DEVICE USING MULTI-CYCLONE DUST FILTRATION

FIELD OF THE INVENTION

The present invention is related to a dust collecting device separating dust by cyclone, particularly to a dust collecting device using multi-cyclone dust filtration.

BACKGROUND OF THE INVENTION

In practice, cyclone separation is one kind of centrifugal sedimentation, in which centrifugal force is used to rotate particles at high speed in an eddy airflow. The higher the rotational speed is, the higher centrifugal sedimentation velocity the particles obtain. Further, the object of separating the particles from the airflow is then achieved. A conventional cyclone separator, as schematically illustrated in FIG. 1, is mainly composed of a separation cylinder 8. The separation cylinder 8 is provided through the wall surface thereof with an air inlet 81, is tapered in the tube diameter thereof toward the bottom, and is provided at the top thereof with an extracting channel 82. When the cyclone separator is put into practice, gas containing dust particles is allowed to enter from the air inlet 81, and then a down draft is formed by the gas along an inner wall of the separation cylinder 8. Finally, an updraft is formed within the separation cylinder 8 due to a suction force applied to the extracting channel 82. The dust is incapable of being raised along with the updraft owing to its own force of gravity, and then settled to the bottom of the separation cylinder 8. Further, the effect of dust collection is generated. The related patented technology is just as disclosed in Taiwan patent no. 1558462.

The dust filtration effect of the conventional cyclone separator is considerably limited. If the enhancement of the dust filtration effect of the cyclone separator is desired, there are mainly two ways of implementation as follows: one is an increased volume of chamber within the separation cylinder, and the other is a multi-layered dust filtering inner cylinder provided within the separation cylinder, as disclosed in the patents Nos. TW 1411422, TW 201340929, CN 103181741, CN 1572220A, JP 2000-254551A, JP 2005-103251A, JP 2005-224602A, JP 2006-205162A, JP 2006-272322A, JP 2006-297057A, JP 2006-346669A, JP 2014-83478A, JP 2015-131264, US 2017/0202418 and US 2018/0036746. However, if the increased volume of chamber within the separation cylinder is put into practice, there is a tendency for the whole volume of the cyclone separator to be bulky without doubt. However, if the multi-layered dust filtering inner cylinder is put into practice, a tendency for the structure of the cyclone separator to be complex may be resulted, so as to not only be unfavorable to maintenance, but also raise a big problem of periodic replacement of the dust filtering inner cylinder. Once the replacement of dust filtering inner cylinder is required in case of an environment where the filtration of hazardous gas is performed, the whole system should be shut down, and even stopped for a period of time for the replacement. In recent years, although the technology of cyclone separation is applied to a household dust suction device successfully, the dust filtration effect thereof is not in conformity with the requirement of industrial application significantly if the structure which is the same as that of the household dust suction device is adopted for industrial practice, since it is only necessary for the household dust suction device to collect a small indefinite quantity of dust particles with relatively lower-level requirement for the dust filtration effect with respect to that required in industry so as to use a small volume and simply-constructed cyclone separator.

In addition, the applicant also proposed a patented technology, as disclosed in a European patent no. 2923625.

SUMMARY OF THE INVENTION

It is the main object of the present invention to solve the problem of incapability of filtering out smaller dust particles by a dust collecting device implemented by cyclone.

For achieving the above object, the present invention provides a dust collecting device using multi-cyclone dust filtration, including a dust collecting chamber, a cyclone chamber and an airflow guiding component. The cyclone chamber is communicated with the dust collecting chamber. The cyclone chamber is provided with an intake port provided for a gas to be filtered to enter, an annular side wall being connected to the intake port and guiding the gas to be filtered to flow spirally so as to form a first cyclone, an engaging port being communicated with the dust collecting chamber and allowing the first cyclone to enter the dust collecting chamber, and an exhaust port. The airflow guiding component is provided within the cyclone chamber. The airflow guiding component is provided with a return flow tube receiving the gas to be filtered returned from the cyclone chamber and guiding the gas to be filtered to flow spirally so as to form a second cyclone, an airflow guiding bonnet coaxially and separately located with respect to the return flow tube, and a dust filtration channel formed between the airflow guiding bonnet and the return flow tube. The first cyclone is incapable of entering the return flow tube from the dust filtration channel due to the restriction provided by the airflow guiding bonnet. The second cyclone is allowed to flow toward the exhaust port. As passing by the dust filtration channel, the second cyclone is capable of throwing dust contained therein into the dust filtration channel. The dust is restricted by the airflow guiding bonnet so as to enter the dust collecting chamber.

In one embodiment, the airflow guiding component is provided with a drainage tube connecting the airflow guiding bonnet to the exhaust port.

In one embodiment, the airflow guiding component is provided with an auxiliary airflow guiding bonnet, which is provided for the return flow tube and allowed for forming, together with the airflow guiding bonnet, the dust filtration channel.

In one embodiment, the airflow guiding component is provided with a plurality of supporting poles connecting the airflow guiding bonnet to the return flow tube.

In one embodiment, the airflow guiding component is provided with a drainage bonnet provided at one side, facing toward the engaging port, of the return flow tube for guiding the gas to be filtered into the return flow tube.

In one embodiment, the return flow tube is provided with a plurality of drainage through-holes provided correspondingly to the drainage bonnet so as to enable part of the gas to be filtered restricted by the drainage bonnet to enter the return flow tube.

In one embodiment, the airflow guiding component is provided with a plurality of connecting ribs connecting the airflow guiding bonnet to the auxiliary airflow guiding bonnet.

In one embodiment, the airflow guiding component is provided with an auxiliary airflow guiding bonnet, which is provided for the return flow tube and allowed for forming, together with the airflow guiding bonnet, the dust filtration channel, the return flow tube is provided with a connecting wall connecting the auxiliary airflow guiding bonnet to the drainage bonnet.

In one embodiment, the airflow guiding component includes a plurality of supporting ribs connecting the return flow tube to the annular side wall. Further, each of the supporting ribs is provided with a windward end and a discharge end along the flow direction of the first cyclone, each supporting rib being provided in an inclined manner, the windward end being higher than the discharge end in position.

In one embodiment, an outer diameter of the return flow tube is smaller than an inner diameter of the annular side wall.

In one embodiment, the cyclone chamber is provided with a first spatial width, while the dust collecting chamber is provided with a second spatial width greater than the first spatial width. Further, each of the dust collecting chamber and the cyclone chamber is formed by a housing, respectively.

In comparison with the conventional art, there are features, obtained from what is disclosed in the foregoing of the present invention, as follows. Multiple cyclones are generated through the airflow guiding component provided in the cyclone chamber in the present invention. In the case of forming cyclone in the return flow tube of the airflow guiding component, the cyclone is restricted by the return flow tube so as to increase rotational speed, and further a higher centrifugal force is used by the cyclone to throw the tiny dust particles, remained in the gas to be filtered, into the dust filtration channel so as to accomplish the secondary dust filtration. Then, gas discharged from the exhaust port is even purer. Thereby, a filter screen provided for the exhaust port may be eliminated without the need for a user to shut down frequently to replace the filter screen.

DETAILED DESCRIPTION OF THE PREFERRED EMBODIMENTS

Figure 1:
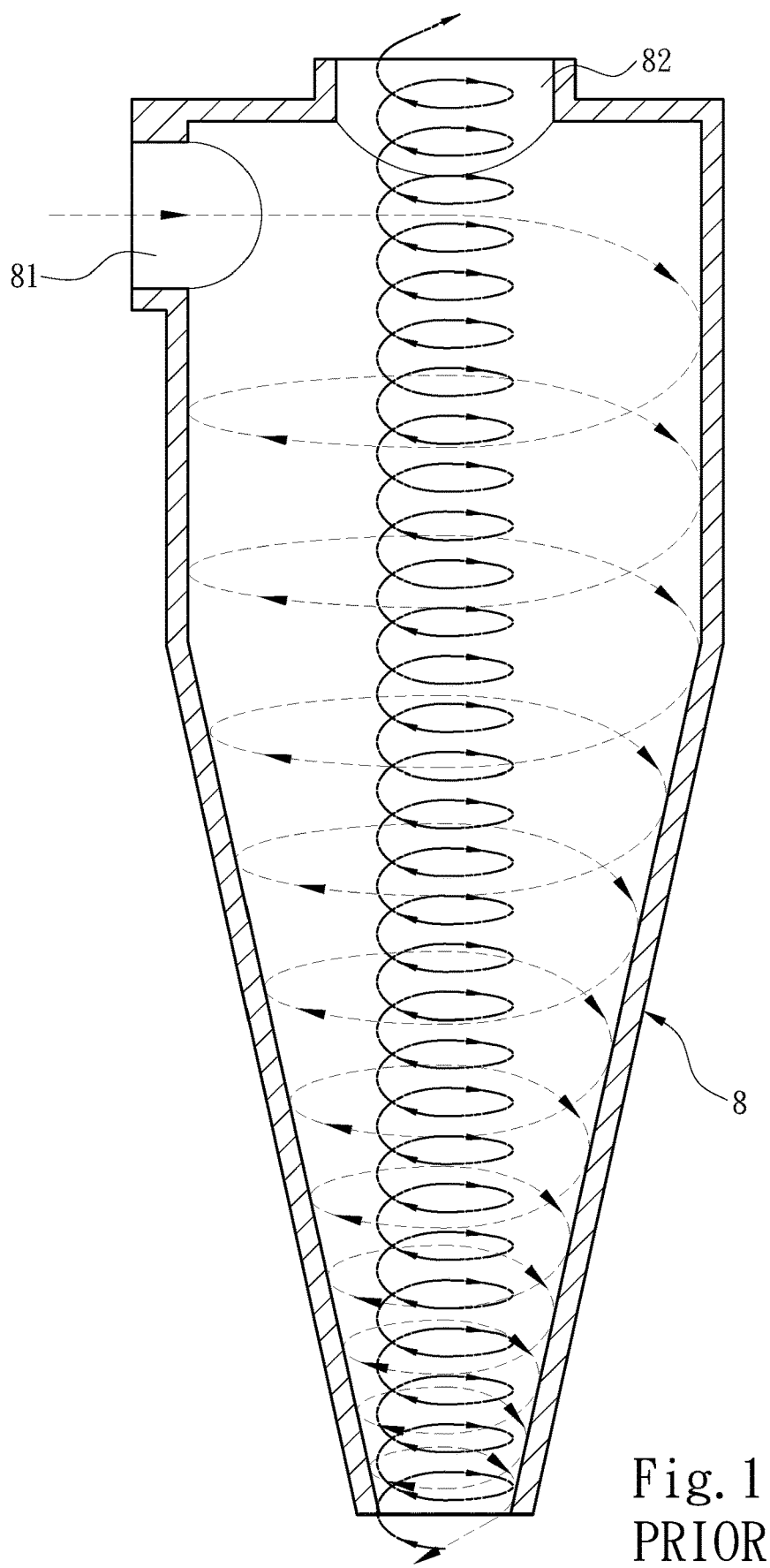
FIG. 1 is a view of the implementation of a conventional cyclone separator.

The detailed description and technical content of the present invention will now be described, in conjunction with drawings, as follows.

Hereinafter, the terms "first" and "second" used for elements are meant to distinguish the elements from each other, and not used for limiting the sequential order thereof. Moreover, the relative spatial expressions including "top end", "bottom edge", "upward", "downward" and so on, mentioned hereinafter are determined on the basis of orientation drawn in the drawings of the context. It should be understood that the relative spatial expressions may be varied along with the change of orientation drawn in the drawings. For instance, the original "top end" and "bottom edge" may be varied as "left" and "right", respectively, once the drawings are rotated to horizontal.

Figure 2:
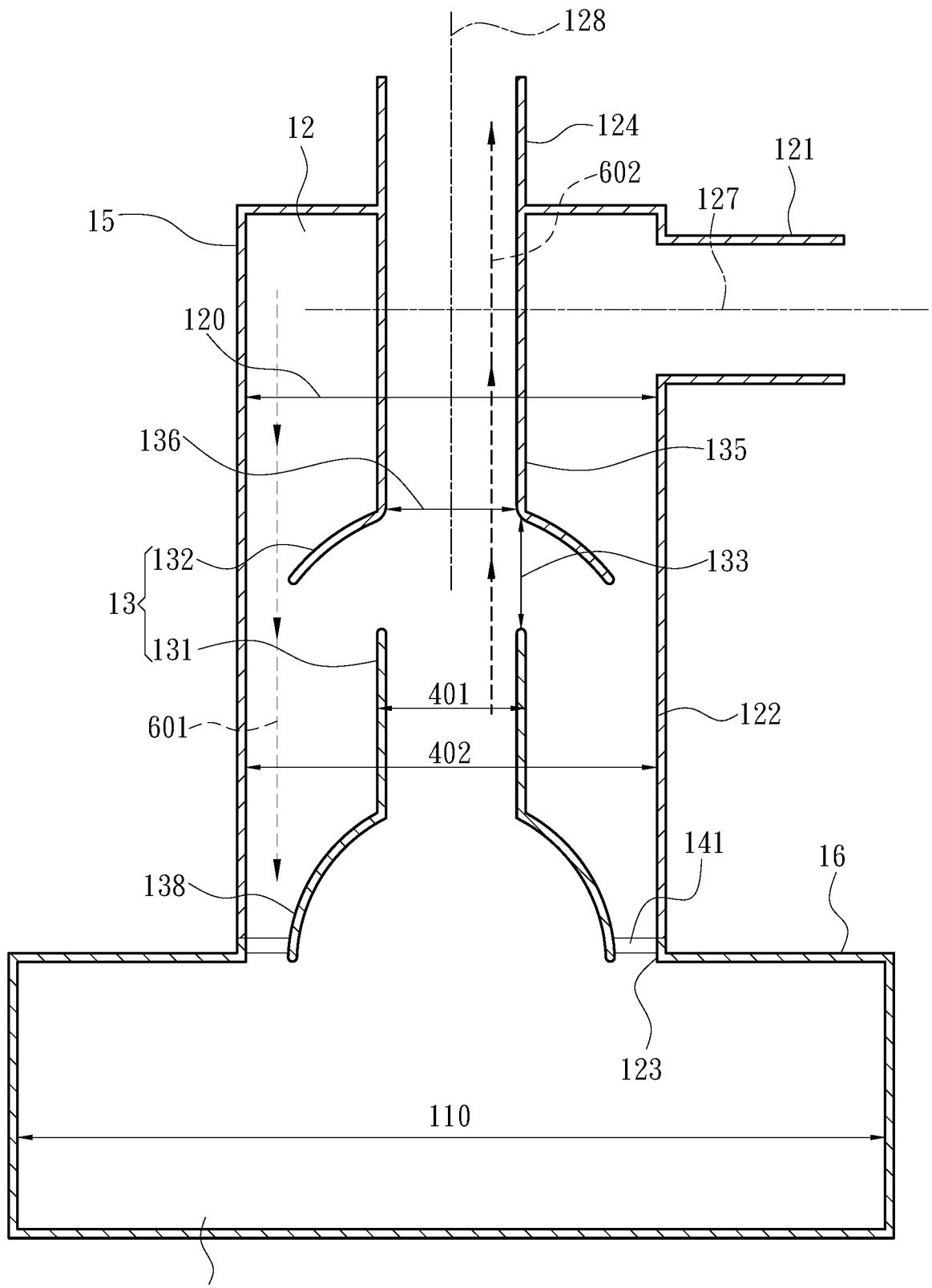
FIG. 2 is a structural view of one embodiment of the present invention.
Figure 3:
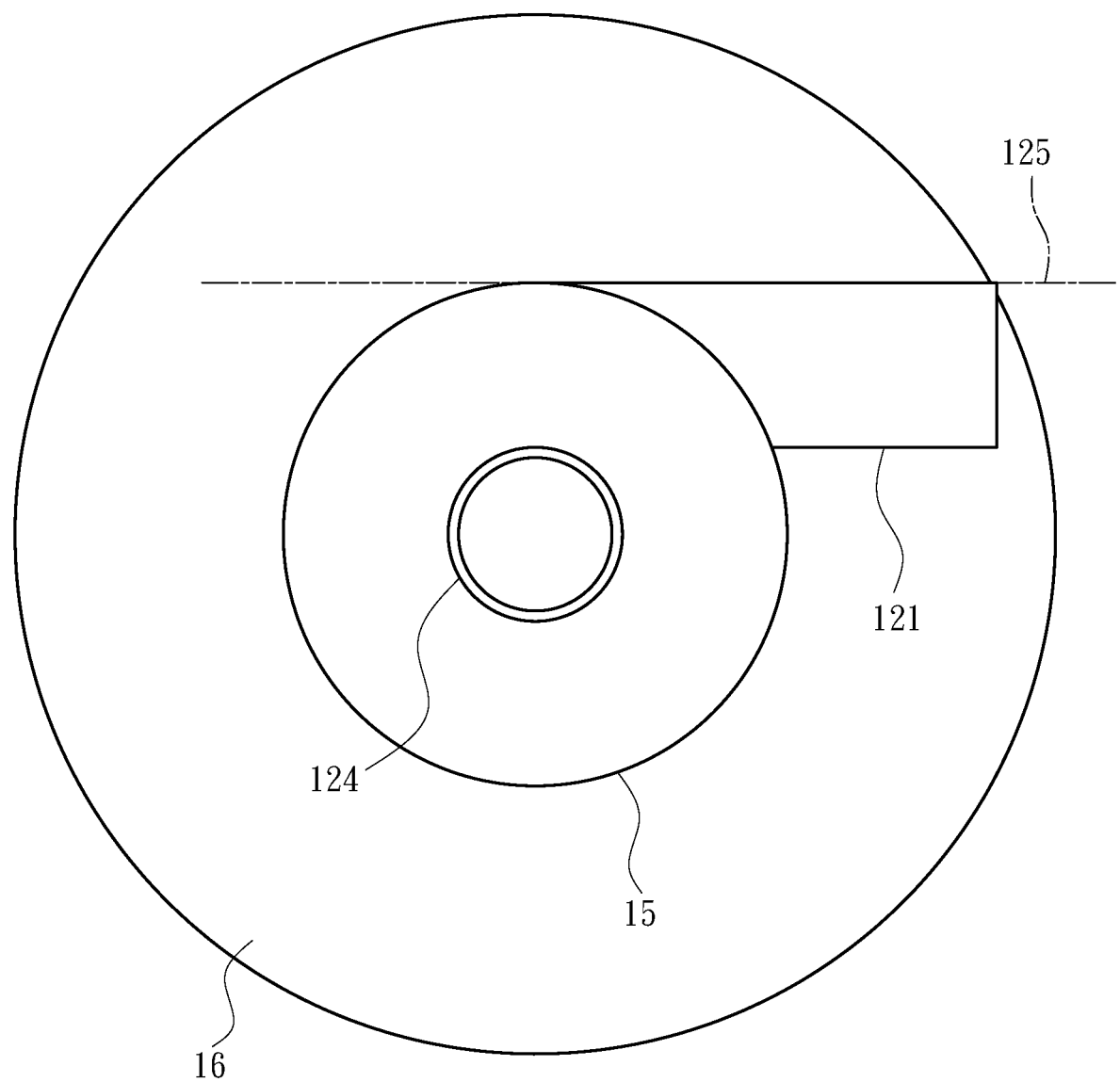
FIG. 3 is a structural top view of one embodiment of the present invention.
Figure 4:
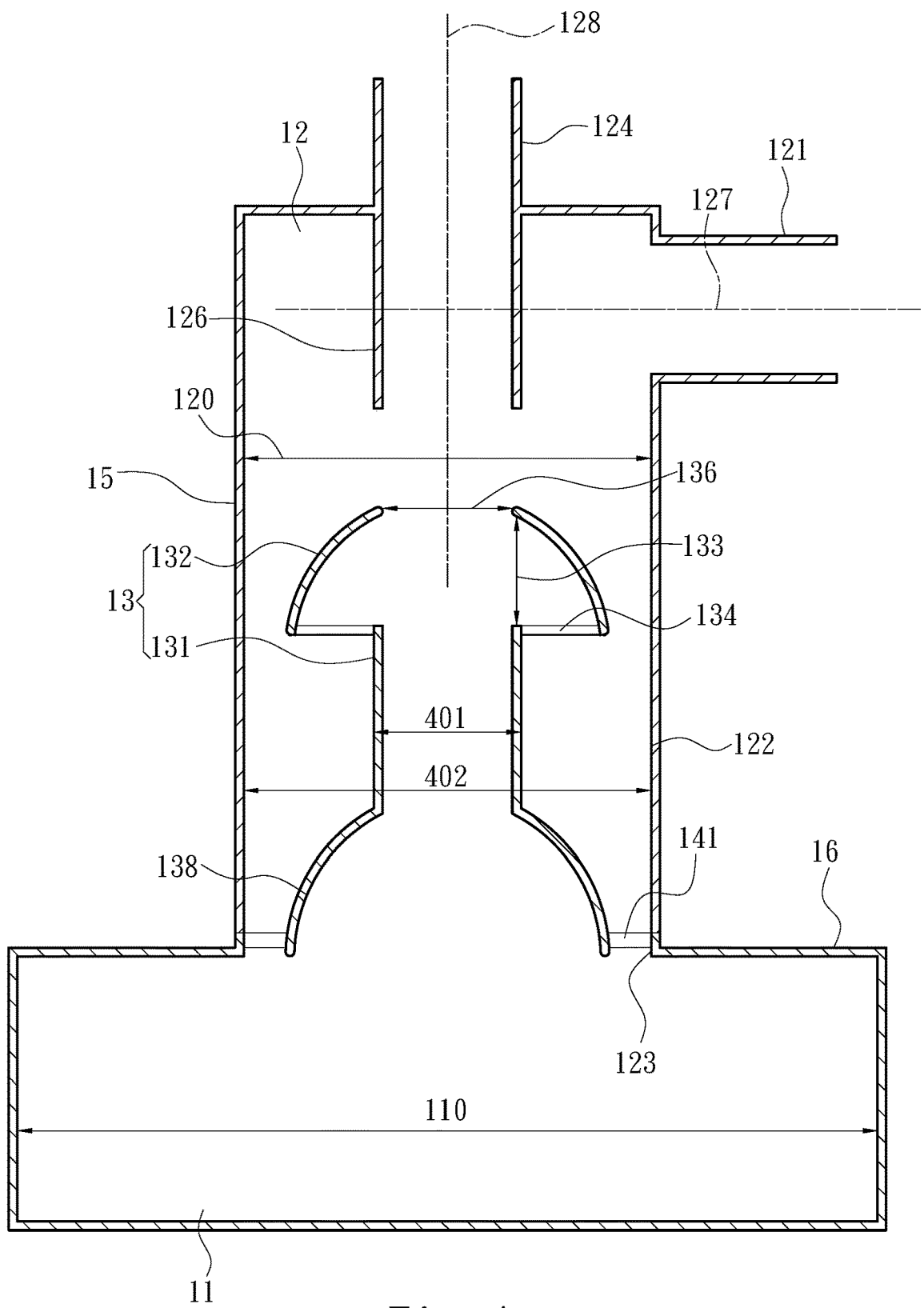
FIG. 4 is a structural view of another embodiment of the present invention.

Referring to FIG. 2, FIG. 3, FIG. 4, FIG. 5 and FIG. 6, the present invention provides a dust collecting device 100 using multi-cyclone dust filtration, the dust collecting device 100 possibly being applied to an industrial process obtaining pure working gas necessarily. The dust collecting device 100 includes a dust collecting chamber 11, a cyclone chamber 12 and an airflow guiding component 13. In this case, the dust collecting chamber 11 is connected to the cyclone chamber 12, the cyclone chamber 12 having a first spatial width 120, while the dust collecting chamber 11 having a second spatial width 110 greater than the first spatial width 120. Further, the first spatial width 120 is directed to a spatial length in the cyclone chamber 12, while the second spatial width 110 is directed to a spatial length in the dust collecting chamber 11. Then, the dust collecting chamber 11 is significantly larger than the cyclone chamber 12 in volume in the present invention, as shown in FIG. 2. Furthermore, the cyclone chamber 12 is communicated with the dust collecting chamber 11, such that gas is capable of flowing between the cyclone chamber 12 and the dust collecting chamber 11. In one embodiment, each of the cyclone chamber 12 and the dust collecting chamber 11 is formed by a housing (15, 16), respectively; that is to say, each of the cyclone chamber 12 and the dust collecting chamber 11 is subordinate to different housings (15, 16), respectively. The two housings (15, 16) are combined through a connecting structure, the connecting structure possibly being selected from a screwing element, a fastening element and so on. Accordingly, an operator is allowed to separate the two housings (15, 16) so as to clean the dust collecting chamber 11 depending on the state of dust collection of the dust collecting device 100. Additionally, the housing 16 forming the dust collecting chamber 11 may be further a dust collecting barrel.

The cyclone chamber 12 is provided with an intake port 121, an annular side wall 122 connected to the intake port 121, an engaging port 123 communicated with the dust collecting chamber 11, and an exhaust port 124. In this case, the intake port 121 is provided on a tangent (as indicated by 125 in FIG. 3) to the annular side wall 122. The intake port 121 may be joined to a tube. In one embodiment, the intake port 121 may be further a tubular structure protruding out of the annular side wall 122. Additionally, the intake port 121 is provided at one end of the cyclone chamber 12 away from the dust collecting chamber 11, i.e., the top end of the cyclone chamber 12, while the engaging port 123 is provided at the bottom edge of the cyclone chamber 12. In one embodiment, the engaging port 123 may be defined by the annular side wall 122. Furthermore, the exhaust port 124 is provided at the top end of the cyclone chamber 12. In one embodiment, the cyclone chamber 12 is provided with a barrier wall 126 provided around the exhaust port 124, the barrier wall 126 being not connected to the airflow guiding component 13, for the reduction of possibility of discharging the gas, entering the cyclone chamber 12 from the intake port 121, via the exhaust port 124 directly. Additionally, a first phantom line 127 may be defined in the extension direction of the intake port 121, while a second phantom line 128 may be defined in the extension direction of the exhaust port 124. The first phantom line 127 and the second phantom line 128 are not intersected in the top view from the cyclone chamber 12. Moreover, the second phantom line 128 is extended longitudinally, while the first phantom line 127 is extended laterally.

On the other hand, the airflow guiding component 13 is provided within the cyclone chamber 12. The airflow guiding component 13 is provided with a return flow tube 131 located within the cyclone chamber 12, an airflow guiding bonnet 132 coaxially and separately located with respect to the return flow tube 131, and a dust filtration channel 133 formed between the airflow guiding bonnet 132 and the return flow tube 131. Further, an outer diameter 401 of the return flow tube 131 is smaller than an inner diameter 402 of the annular side wall 122, such that a space allowing the flow of cyclone is still provided between the return flow tube 131 and the annular side wall 122. Additionally, a part existing between the airflow guiding bonnet 132 and the return flow tube 131 is not connected therebetween, and the part is just the dust filtration channel 133. By way of the dust filtration channel 133, the internal space of the return flow tube 131 is communicated with the cyclone chamber 12; that is to say, gas is allowed to enter the cyclone chamber 12 from the return flow tube 131 via the dust filtration channel 133 without being pushed by external force. In one embodiment, the airflow guiding component 13 is provided with a plurality of supporting poles 134 connecting the airflow guiding bonnet 132 to the return flow tube 131. Further, each of the plurality of supporting poles 134 is allowed to connect one end of the return flow tube 131 facing toward the airflow guiding bonnet 132 to one side of the airflow guiding bonnet 132 facing toward the return flow tube 131. The pattern and actual location of the plurality of supporting poles 134 may be modified appropriately depending on implementation, without being reiterated herein any more. Furthermore, besides the disclosure in the former embodiment, the airflow guiding bonnet 132 may be also fixed through the structure disclosed in another embodiment. In this embodiment, the airflow guiding component 13 is provided with a drainage tube 135 connecting the airflow guiding bonnet 132 to the exhaust port 124. The drainage tube 135 and the return flow tube 131 are located coaxially. The drainage tube 135, together with the airflow guiding bonnet 132, may be formed as integral structure. Furthermore, the airflow guiding bonnet 132 may be further formed as umbrella-shaped structure. Assuming a portion of the airflow guiding bonnet 132 corresponding to the return flow tube 131 is considered as a top end, the bottom end of the airflow guiding bonnet 132 may face toward the engaging port 123. One side of the dust filtration channel 133 is blocked by the airflow guiding bonnet 132, such that gas coming from the intake port 121 is incapable of entering the dust filtration channel 133. In addition, a portion of the airflow guiding bonnet 132 corresponding to the return flow tube 131 is a vent 136. In other words, the vent 136, the return flow tube 131 and the drainage tube 135 are located on the same axis. Furthermore, after the cyclone chamber 12 and the airflow guiding component 13 of the present invention are combined, a first cyclone path 601 advancing toward the dust collecting chamber 11 along the annular side wall 122 and a second cyclone path 602 being delimited by the return flow tube 131, advancing toward the exhaust port 124 and passing by the dust filtration channel 133 are formed. Additionally, the initial part of the second cyclone path 602 is limited by the return flow tube 131 of the present invention, such that cyclone formed here is compact due to the effect of the return flow tube 131.

Figure 5:
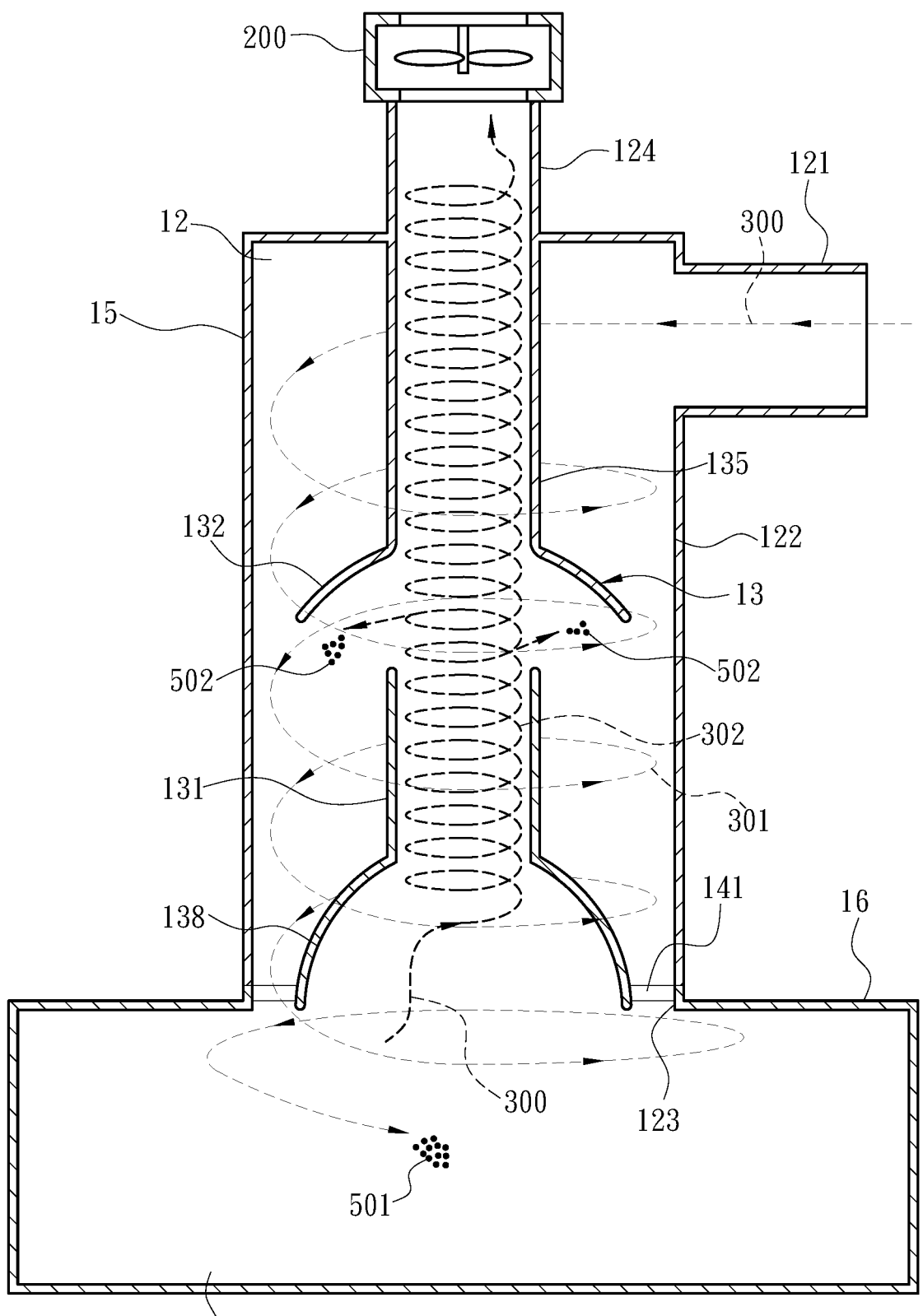
FIG. 5 is a view of the implementation of one embodiment of the present invention.
Figure 6:
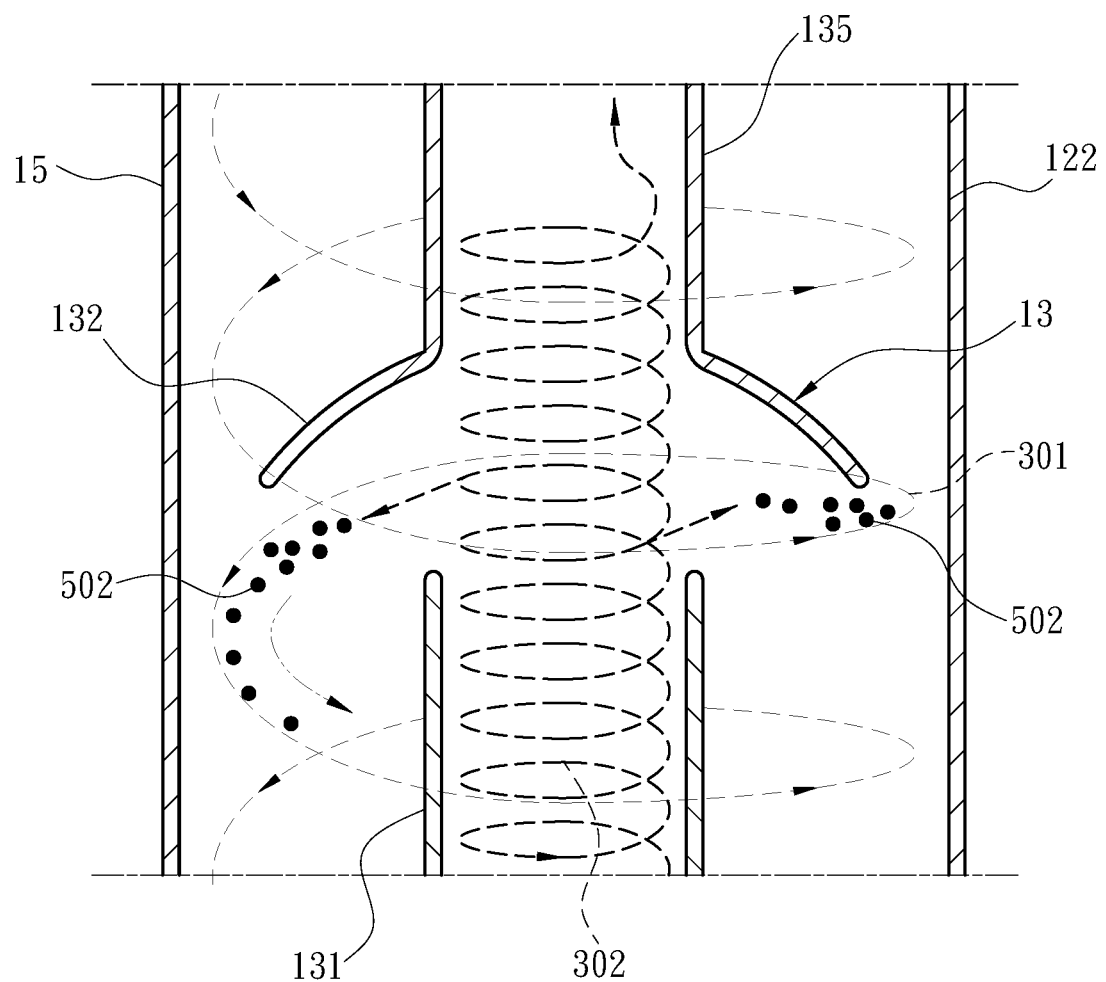
FIG. 6 is an enlarged view of partial structure showing the implementation of one embodiment of the present invention.

Referring to FIG. 5 together, when the dust collecting device 100 is put into practice, the intake port 121 may be connected to an apparatus, capable of generating a gas to be filtered 300, via a tube, or may be provided within a space filled with the gas to be filtered 300 directly. On the other hand, the exhaust port 124 is connected to an air extracting device 200. The cyclone chamber 12 is allowed to enter negative pressure state after the air extracting device 200 is started, so as to suck the gas to be filtered 300 into the cyclone chamber 12 via the intake port 121. On the basis of the design of the intake port 121, however, the gas to be filtered 300 is allowed to flow spirally along with the annular side wall 122 after entering the cyclone chamber 12, so as to form a first cyclone 301. The first cyclone 301 is allowed to travel downward along the annular side wall 122, and finally enter the dust collecting chamber 11 via the engaging port 123; that is to say, the first cyclone 301 is allowed to advance along the first cyclone path 601. Additionally, the first cyclone 301 is incapable of entering the return flow tube 131 from the dust filtration channel 133 in the process of downward travel due to the restriction provided by the airflow guiding bonnet 132. Furthermore, the size of the dust collecting chamber 11 is larger than that of the cyclone chamber 12, such that the rotational speed of the first cyclone 301 is reduced, and meanwhile the dust (for instance, 501 depicted in FIG. 5) mingled with the gas to be filtered 300 is separated from the gas to be filtered 300 so as to fall into the dust collecting chamber 11 owing to the effect of the reduction of rotational speed of the first cyclone 301 and the force of gravity of the dust itself. In this way, the primary dust filtration is completed. Furthermore, the air extracting device 200 is not stopped working, in such a way that the gas to be filtered 300 entering the dust collecting chamber 11 is sucked into the return flow tube 131. As entering the return flow tube 131, the gas to be filtered 300 is also allowed to flow spirally along the return flow tube 131 immediately and then form a second cyclone 302. At this moment, the dust collected within the dust collecting chamber 11 is not mixed into the second cyclone 302 due to its own weight. Furthermore, the speed of the second cyclone 302 is higher than that of the first cyclone 301 significantly due to a tube diameter of the return flow tube 131 being smaller than that of the dust collecting chamber 11, such that a higher centrifugal force may be generated by the second cyclone 302. Subsequently, when the second cyclone 302 is allowed to travel upward along the return flow tube 131; that is to say, when the second cyclone 302 is allowed to advance in the second cyclone path 602, dust (502 depicted in FIG. 5 and FIG. 6) entrained in the second cyclone 302 is thrown into the dust filtration channel 133 due to centrifugal force of the second cyclone 302, as the second cyclone 302 passing by the dust filtration channel 133, for the secondary dust filtration. The dust thrown into the dust filtration channel 133, however, is restricted by the airflow guiding bonnet 132, so as to be mixed into the first cyclone 301 again. Afterward, the second cyclone 302 is allowed to advance toward the exhaust port 124 continuously, and then leave the dust collecting device 100 via the exhaust port 124. Additionally, the dusts contained in the gas to be filtered 300 are different in size, such that the larger dust grains may be separated from the gas to be filtered 300 in the primary dust filtration, while the smaller dust grains may be separated from the gas to be filtered 300 in the secondary dust filtration of the dust collecting device 100. In this way, not only purer gas may be obtained, but also the filter screen provided for the exhaust port 124 may be eliminated. It is unnecessary for a user to dismantle the dust collecting device 100 several times to replace the filter screen if the filter screen is eliminated, so as to facilitate the use in a working environment where the gas to be filtered 300 includes hazardous gas.

Figure 7:
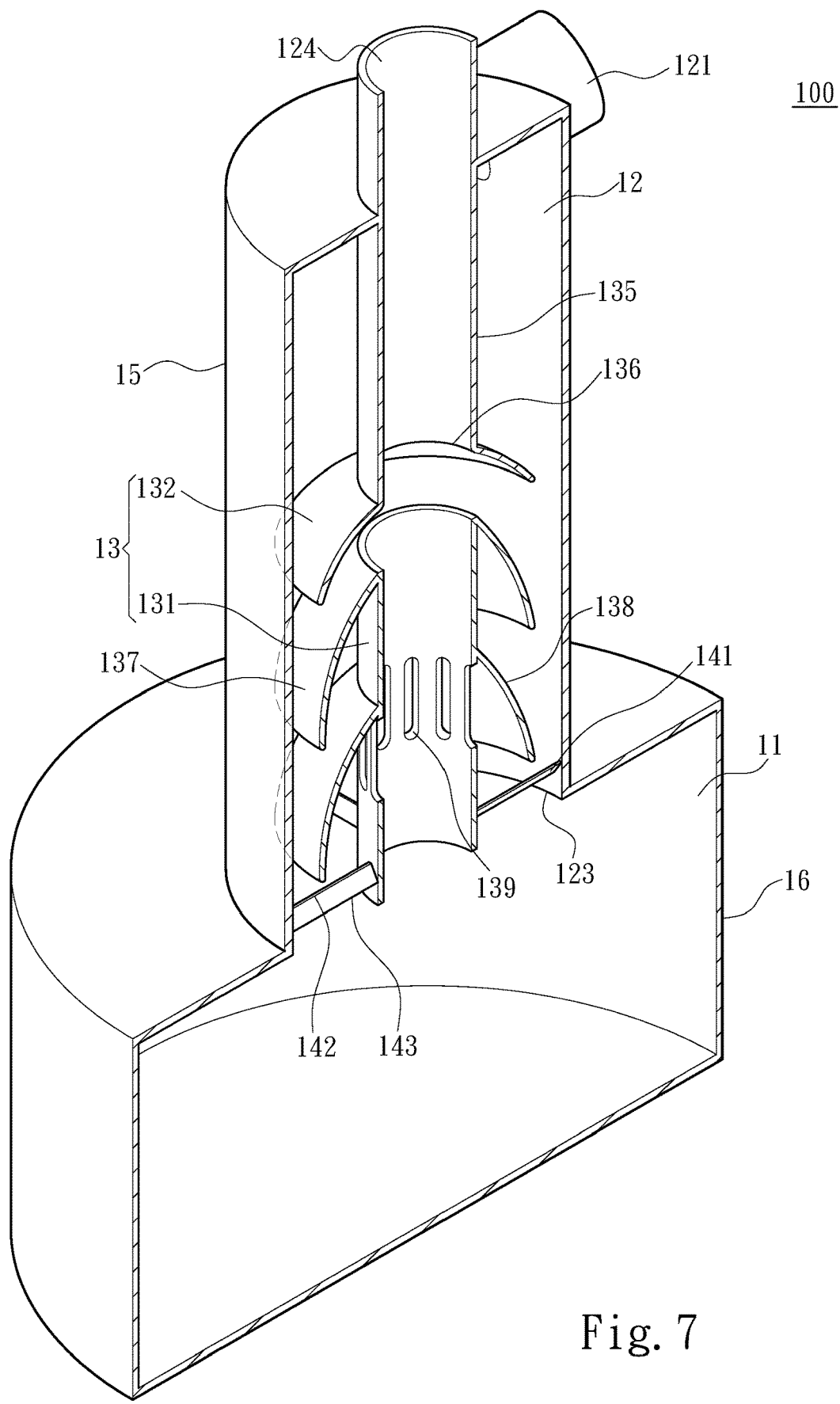
FIG. 7 is a cross-sectional view of three-dimensional structure of another embodiment of the present invention.
Figure 8:
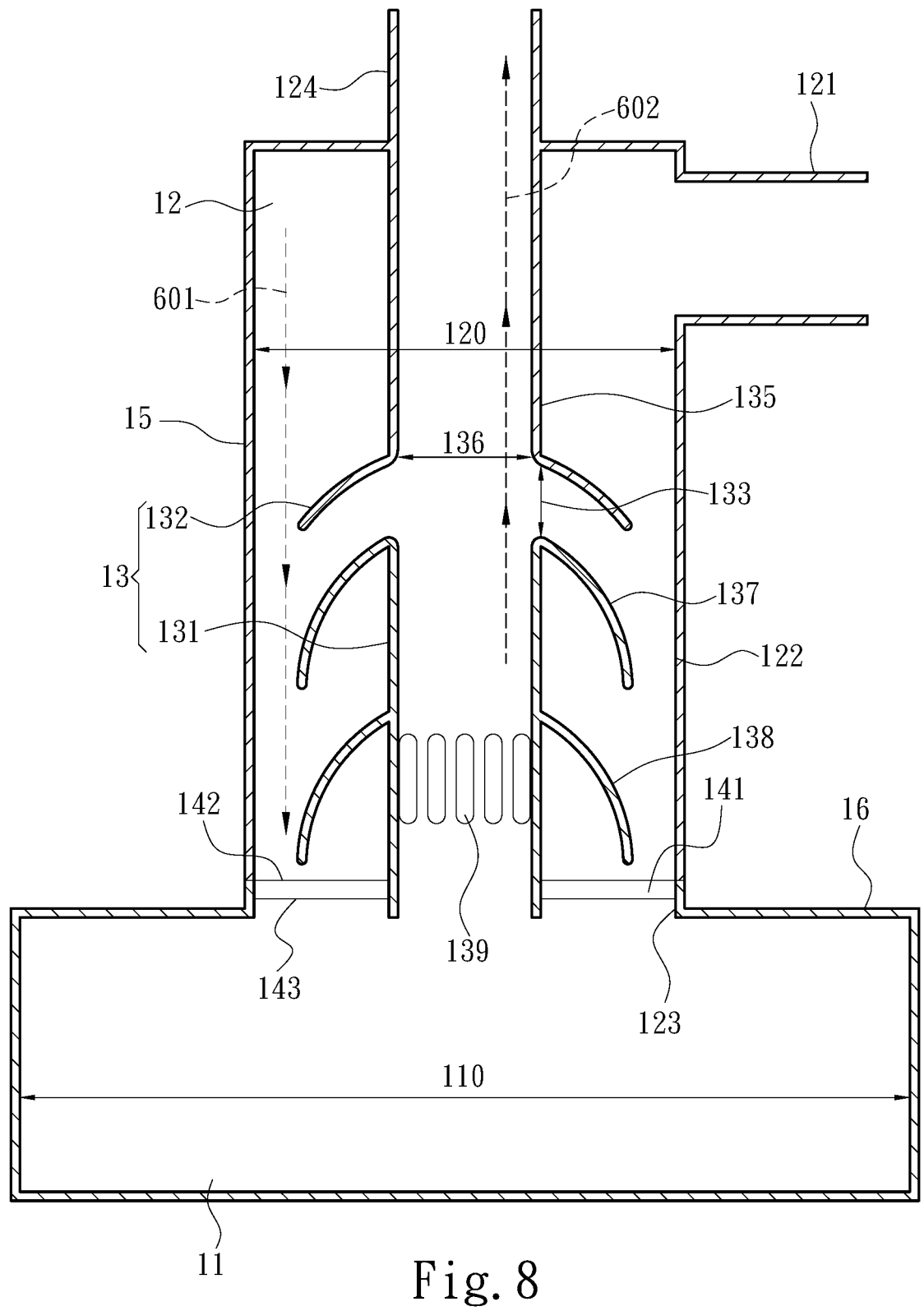
FIG. 8 is a cross-sectional view of three-dimensional structure of one embodiment of the present invention.
Figure 9:
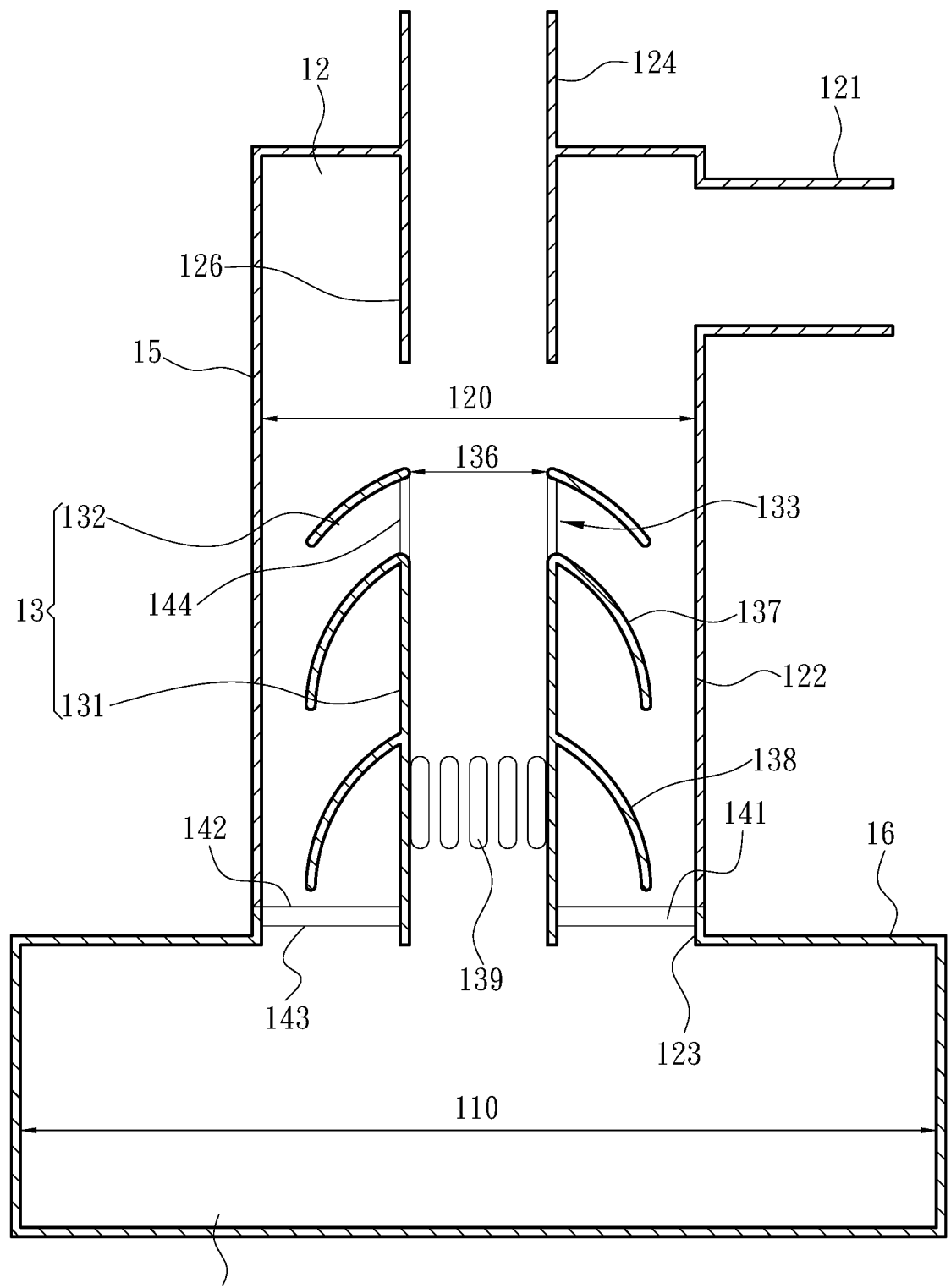
FIG. 9 is a structural view of another embodiment of the present invention.
Figure 10:
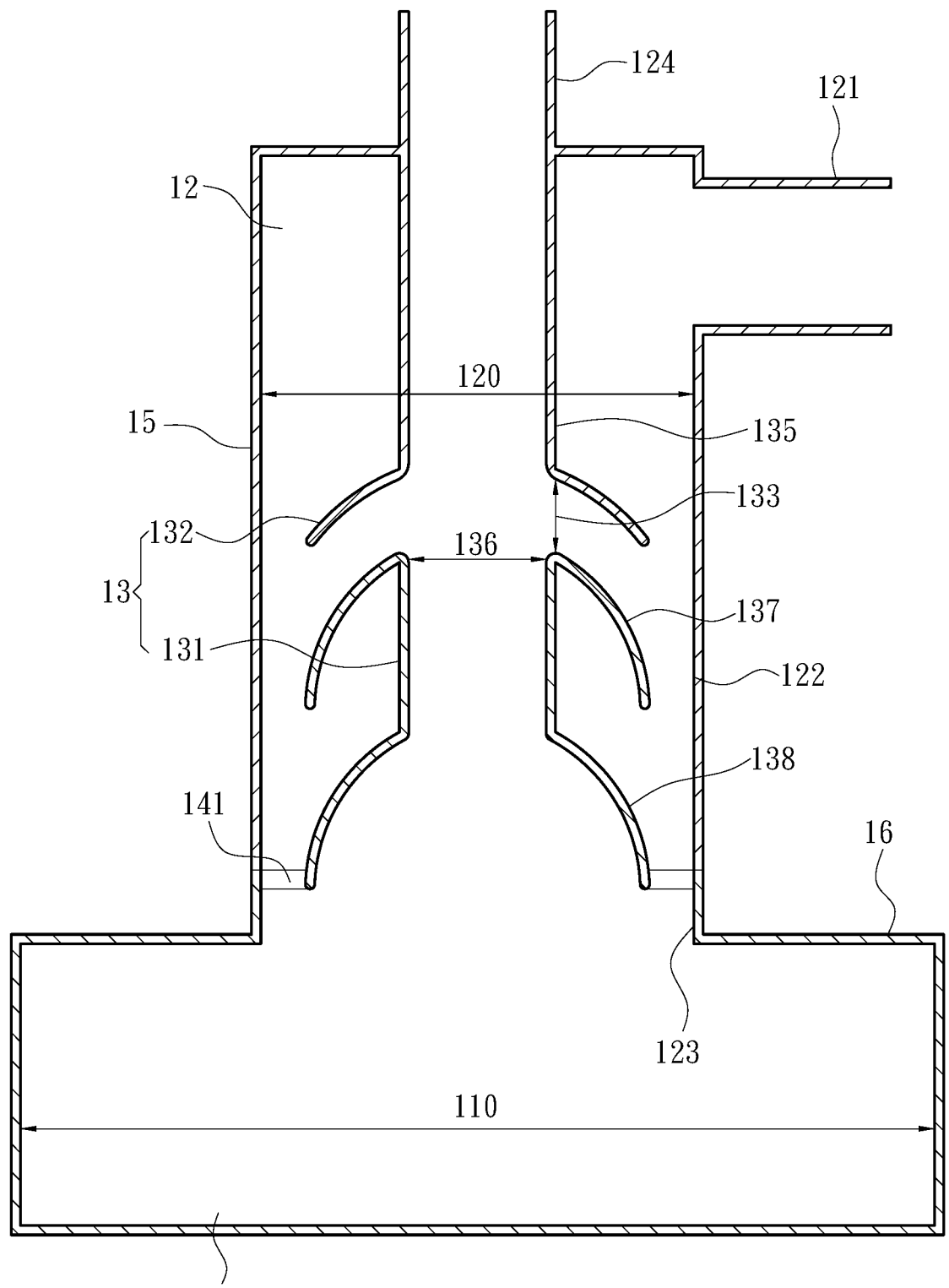
FIG. 10 is a structural view of another embodiment of the present invention.
Figure 11:
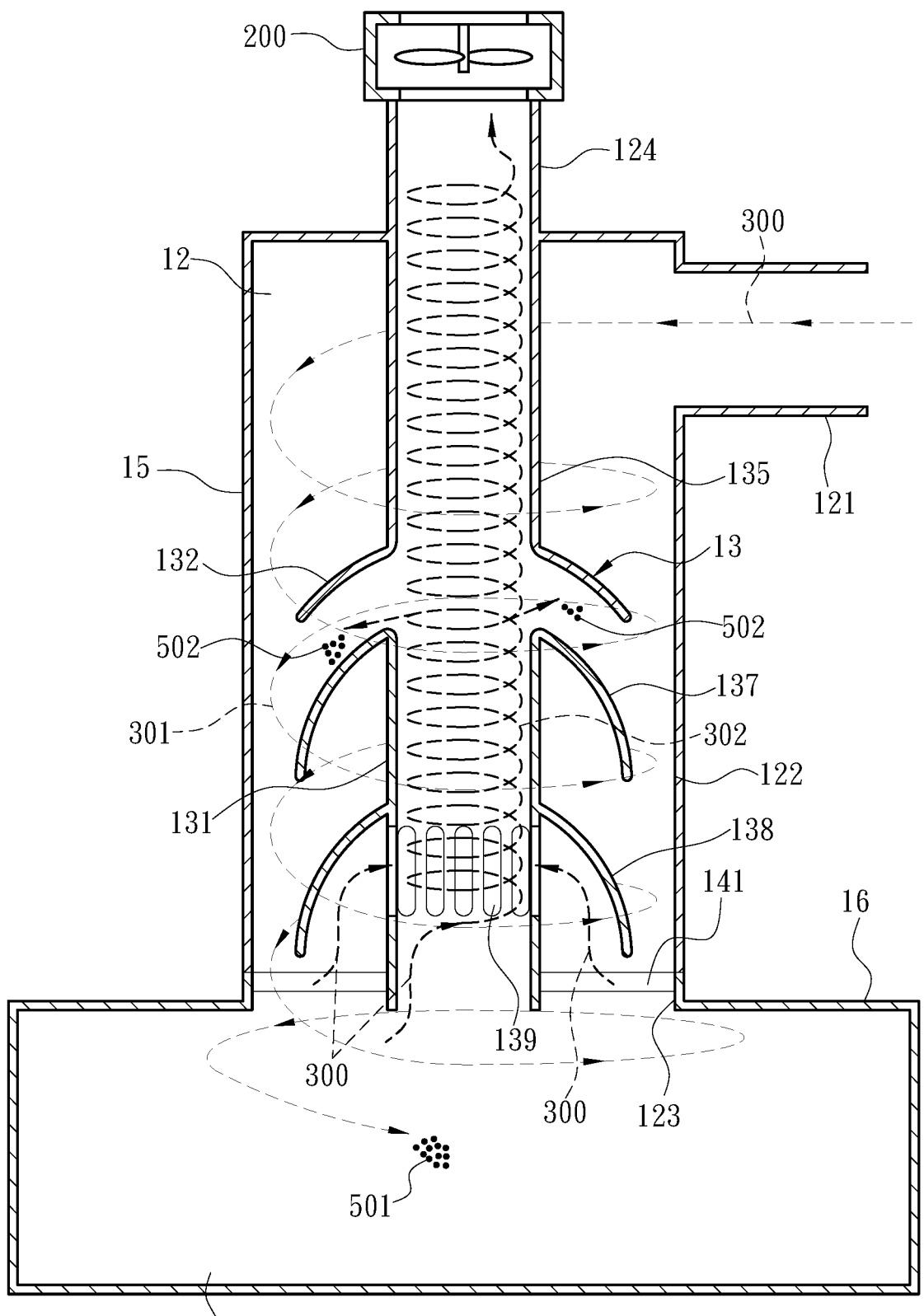
FIG. 11 is a view showing the implementation of another embodiment of the present invention.
Figure 12:
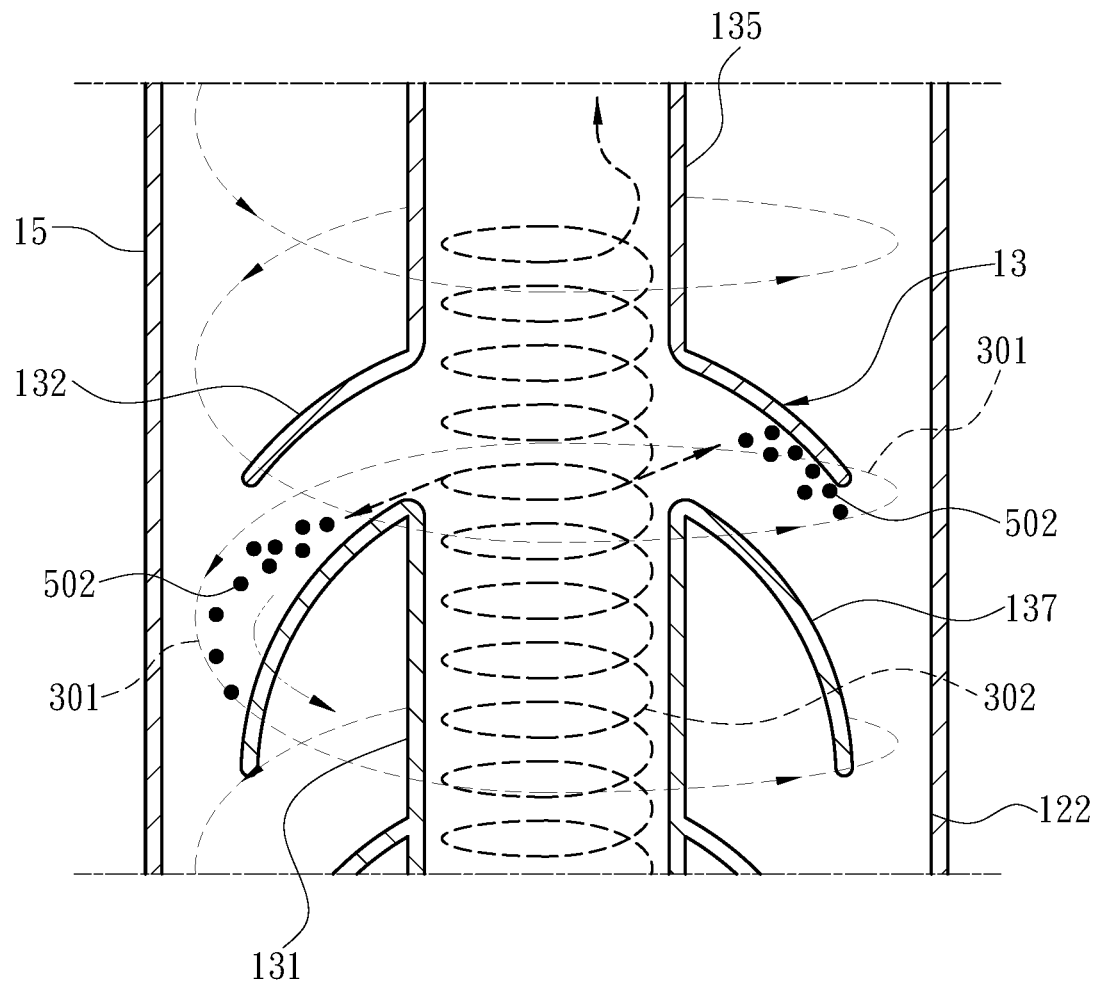
FIG. 12 an enlarged view of partial structure showing the implementation of one embodiment of the present invention.

In one embodiment, referring to FIG. 7, FIG. 8, FIG. 9, FIG. 10, FIG. 11, FIG. 12 and FIG. 13 together, the airflow guiding component 13 is provided with an auxiliary airflow guiding bonnet 137, which is provided for the return flow tube 131 and allowed for forming, together with the airflow guiding bonnet 132, the dust filtration channel 133. The auxiliary airflow guiding bonnet 137 may be extended from an edge, facing toward the airflow guiding bonnet 132, of the return flow tube 131, while the auxiliary airflow guiding bonnet 137 and the airflow guiding bonnet 132 are provided as the same umbrella-shaped structure with an identical pattern. Further, each of the auxiliary airflow guiding bonnet 137 and the airflow guiding bonnet 132 is located at one side of the dust filtration channel 133, respectively. The dust, when thrown by the second cyclone 302, is allowed to advance toward the cyclone chamber 12 along a space between the auxiliary airflow guiding bonnet 137 and the airflow guiding bonnet 132, as depicted in FIG. 12. In another embodiment, referring to FIG. 9 again, the airflow guiding component 13 may be provided with a plurality of connecting ribs 144 connecting the airflow guiding bonnet 132 to the auxiliary airflow guiding bonnet 137. The plurality of connecting ribs 144 are provided in a spaced manner; that is to say, a space for gas to flow is presented between any two adjacent connecting ribs 144. The plurality of connecting ribs 144 are allowed to support the airflow guiding bonnet 132, so as to enable not only separation of the airflow guiding bonnet 132 and the auxiliary airflow guiding bonnet 137, but also non-necessity for the airflow guiding bonnet 132 to obtain support from other members. On the other hand, the airflow guiding component 13 is provided with a drainage bonnet 138 provided at one side, facing toward the engaging port 123, of the return flow tube 131 for guiding the gas to be filtered 300 into the return flow tube 131, so as to enable the gas to be filtered 300 to enter the return flow tube 131 more positively. Further, referring to FIG. 10, it is possible to provide the drainage bonnet 138 at an edge, facing toward the engaging port 123, of the return flow tube 131. Moreover, the pattern of the drainage bonnet 138 is identical to that of the airflow guiding bonnet 132. A port, connected to one end of the return flow tube 131, of the drainage bonnet 138 is smaller than the other port, far away from the return flow tube 131, of the drainage bonnet 138 in diameter. Referring to FIG. 7, FIG. 8 and FIG. 9 again, the drainage bonnet 138 is not necessary to be provided at the edge, facing toward the engaging port 123, of the return flow tube 131, but is only necessary to be provided at one side, close to the engaging port 123, of the return flow tube 131. Moreover, the return flow tube 131 is provided, at one side close to the engaging port 123 thereof, with at least one drainage through-hole 139 provided correspondingly to the drainage bonnet 138, in the case that the drainage bonnet 138 is mounted to the side wall of the return flow tube 131, such that the drainage through-holes 139 may enable part of the gas to be filtered 300, which is not allowed to enter the return flow tube 131 from the end thereof and then restricted by the drainage bonnet 138, to enter the return flow tube 131 via the drainage through-holes 139, just as depicted in FIG. 11.

Figure 13:
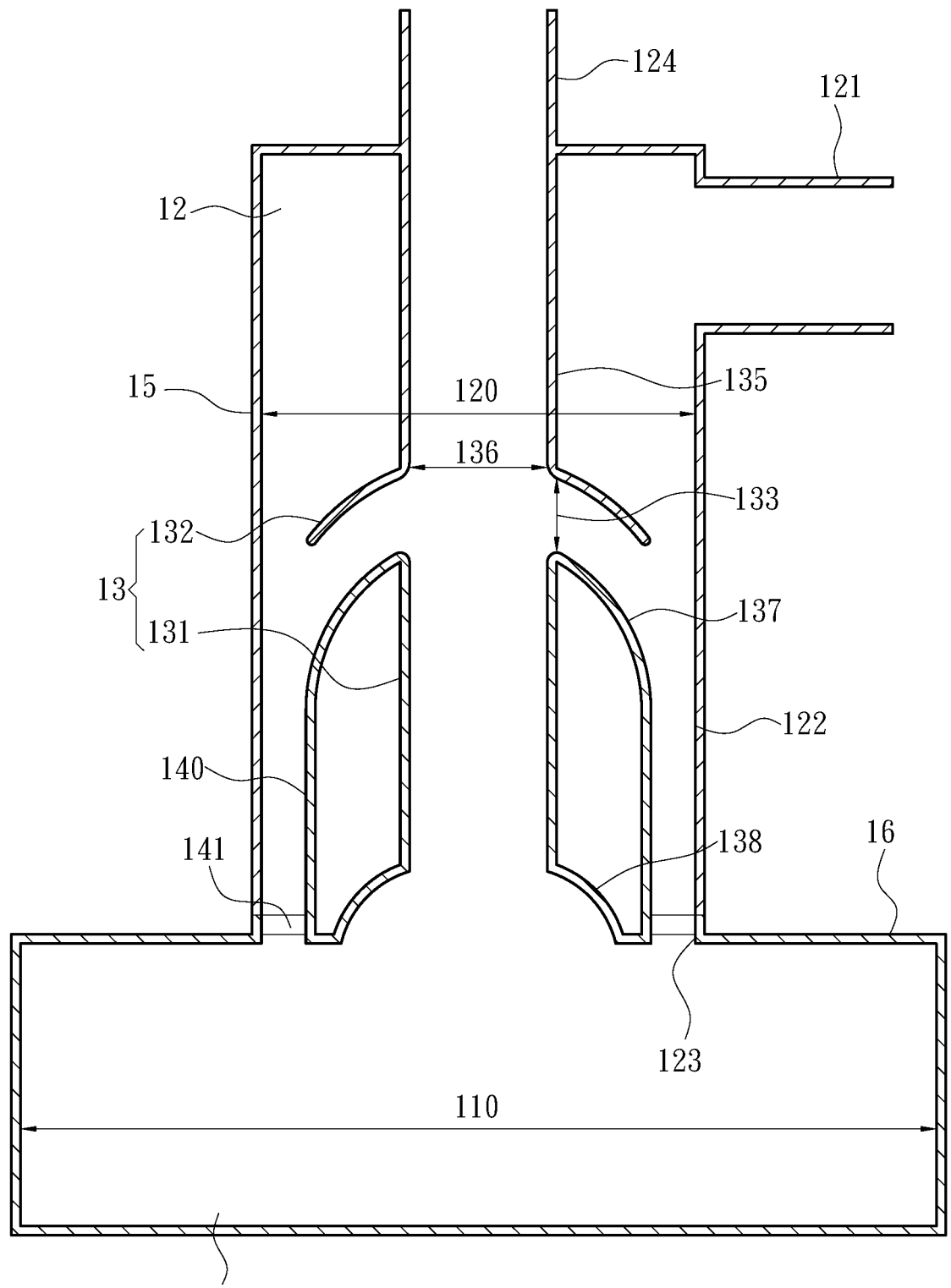
FIG. 13 a structural view of another embodiment of the present invention.

Referring to FIG. 13 together, in one embodiment, the return flow tube 131 is provided with a connecting wall 140 connecting the auxiliary airflow guiding bonnet 137 to the drainage bonnet 138. The connecting wall 140 may be provided in parallel with the tube wall of the return flow tube 131. The connecting wall 140 and the auxiliary airflow guiding bonnet 137 are cooperated to restrict the moving path of the first cyclone 301, so as to reduce the possibility of abnormity of the first cyclone 301. Additionally, the return flow tube 131 of this embodiment may be integrally formed.

Referring to FIG. 2, FIG. 3, FIG. 4, FIG. 5, FIG. 6, FIG. 7, FIG. 8, FIG. 9, FIG. 10, FIG. 11, FIG. 12 and FIG. 13 again, the airflow guiding component 13 of the present invention includes a plurality of supporting ribs 141 connecting the return flow tube 131 to the annular side wall 122. The plurality of supporting ribs 141 are provided in a spaced manner, such that a zone allowing gas to flow is presented between any two adjacent supporting ribs 141. The return flow tube 131 may be provided at the center of the cyclone chamber 12 due to the plurality of supporting ribs 141. Moreover, referring to FIG. 7, each of the plurality of supporting ribs 141 is provided with a windward end 142 and a discharge end 143 along the flow direction of the first cyclone 301 in one embodiment. Each supporting rib 141 is provided in an inclined manner, in which the windward end 142 is higher than the discharge end 143 in position. More specifically, in this embodiment, the function of guiding the first cyclone 301, besides supporting the return flow tube 131, is further provided for each supporting rib 141. Each supporting rib 141 is inclined in the flow direction of the first cyclone 301. Once contacting the windward end 142, the first cyclone 301 is guided by the supporting rib 141 so as to flow toward the dust collecting chamber 11 and finally leave the supporting rib 141 from the discharge end 143. Accordingly, the resistance to the first cyclone 301 may be reduced due to each supporting rib 141 when the present invention is embodied.

What is claimed is:

1. A dust collecting device using multi-cyclone dust filtration, comprising:
    a dust collecting chamber;
    a cyclone chamber, communicated with said dust collecting chamber, said cyclone chamber being provided with an intake port provided for a gas to be filtered to enter, an annular side wall being connected to said intake port and guiding said gas to be filtered to flow spirally so as to form a first cyclone, an engaging port being communicated with said dust collecting chamber and allowing said first cyclone to enter said dust collecting chamber, and an exhaust port; and
    an airflow guiding component, provided within said cyclone chamber, said airflow guiding component being provided with a return flow tube receiving said gas to be filtered returned from said cyclone chamber and guiding said gas to be filtered to flow spirally so as to form a second cyclone, an airflow guiding bonnet coaxially and separately located with respect to said return flow tube, and a dust filtration channel formed between said airflow guiding bonnet and said return flow tube, said first cyclone being incapable of entering said return flow tube from said dust filtration channel due to the restriction provided by said airflow guiding bonnet, said second cyclone flowing toward said exhaust port, said second cyclone throwing dust contained therein into said dust filtration channel as passing by said dust filtration channel, dust being restricted by said airflow guiding bonnet so as to enter said dust collecting chamber, wherein said airflow guiding component includes a plurality of supporting ribs connecting said return flow tube to said annular side wall, and each of said plurality of supporting ribs is provided with a windward end and a discharge end along a flow direction of said first cyclone, each of said plurality of supporting ribs is provided in an inclined manner, said windward end is higher than said discharge end in position.

2. The dust collecting device using multi-cyclone dust filtration according to claim 1, wherein said airflow guiding component is provided with a drainage tube connecting said airflow guiding bonnet to said exhaust port.

3. The dust collecting device using multi-cyclone dust filtration according to claim 1, wherein said airflow guiding component is provided with an auxiliary airflow guiding bonnet, which is provided for said return flow tube and allowed for forming, together with said airflow guiding bonnet, said dust filtration channel.

4. The dust collecting device using multi-cyclone dust filtration according to claim 3, wherein said airflow guiding component is provided with a drainage bonnet provided at one side, facing toward said engaging port, of said return flow tube for guiding said gas to be filtered into said return flow tube.

5. The dust collecting device using multi-cyclone dust filtration according to claim 4, wherein said return flow tube is provided with at least one drainage through-hole provided correspondingly to said drainage bonnet so as to enable part of said gas to be filtered restricted by said drainage bonnet to enter said return flow tube.

6. The dust collecting device using multi-cyclone dust filtration according to claim 3, wherein said airflow guiding component is provided with a plurality of connecting ribs connecting said airflow guiding bonnet to said auxiliary airflow guiding bonnet.

7. The dust collecting device using multi-cyclone dust filtration according to claim 1, wherein said airflow guiding component is provided with a plurality of supporting poles connecting said airflow guiding bonnet to said return flow tube.

8. The dust collecting device using multi-cyclone dust filtration according to claim 1, wherein said airflow guiding component is provided with a drainage bonnet provided at one side, facing toward said engaging port, of said return flow tube for guiding said gas to be filtered into said return flow tube.

9. The dust collecting device using multi-cyclone dust filtration according to claim 8, wherein said return flow tube is provided with a plurality of drainage through-holes provided correspondingly to said drainage bonnet so as to enable part of said gas to be filtered restricted by said drainage bonnet to enter said return flow tube.

10. The dust collecting device using multi-cyclone dust filtration according to claim 8, wherein said airflow guiding component is provided with an auxiliary airflow guiding bonnet, which is provided for said return flow tube and allowed for forming, together with said airflow guiding bonnet, said dust filtration channel, said return flow tube is provided with a connecting wall connecting said auxiliary airflow guiding bonnet to said drainage bonnet.

11. The dust collecting device using multi-cyclone dust filtration according to claim 1, wherein an outer diameter of said return flow tube is smaller than an inner diameter of said annular side wall.

12. The dust collecting device using multi-cyclone dust filtration according to claim 1, wherein said cyclone chamber is provided with a first spatial width, while said dust collecting chamber is provided with a second spatial width greater than said first spatial width.

13. The dust collecting device using multi-cyclone dust filtration according to claim 12, wherein each of said dust collecting chamber and said cyclone chamber is formed by a housing, respectively.

* * * * *